United States Patent
Cudak et al.

(10) Patent No.: US 9,176,854 B2
(45) Date of Patent: *Nov. 3, 2015

(54) PRESENTING ENCLOSURE CACHE AS LOCAL CACHE IN AN ENCLOSURE ATTACHED SERVER

(71) Applicant: INTERNATIONAL BUSINESS MACHINES CORPORATION, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 158 days.

This patent is subject to a terminal disclaimer.

(21) Appl. No.: 13/728,771

(22) Filed: Dec. 27, 2012

(65) Prior Publication Data

US 2014/0173114 A1 Jun. 19, 2014

Related U.S. Application Data

(63) Continuation of application No. 13/716,991, filed on Dec. 17, 2012.

(51) Int. Cl.
*G06F 12/08* (2006.01)
*G06F 12/02* (2006.01)

(52) U.S. Cl.
CPC ............ *G06F 12/02* (2013.01); *G06F 12/0813* (2013.01); *G06F 12/0866* (2013.01); *G06F 2212/6042* (2013.01)

(58) Field of Classification Search
USPC .......................................................... 711/118
See application file for complete search history.

(56) References Cited

U.S. PATENT DOCUMENTS

| 6,076,143 | A | 6/2000 | Blumenau | |
|---|---|---|---|---|
| 6,314,503 | B1* | 11/2001 | D'Errico et al. | 711/165 |
| 7,788,449 | B2 | 8/2010 | Karn et al. | |
| 7,856,530 | B1* | 12/2010 | Mu | 711/119 |
| 8,539,150 | B2* | 9/2013 | Araki et al. | 711/113 |
| 8,775,737 | B2* | 7/2014 | Hsieh et al. | 711/118 |
| 2002/0156979 | A1* | 10/2002 | Rodriguez | 711/129 |
| 2003/0070045 | A1* | 4/2003 | Dwyer et al. | 711/128 |

(Continued)

OTHER PUBLICATIONS

Wood, T., et al., "Sandpiper: Black-box and gray-box resource management for virtual machines", Computer Networks, vol. 53, Issue 17, Dec. 2009, pp. 2923-2938, Elsevier, New York, NY, USA, DOI: 10.1016/j.comnet.2009.04.014, URL: http://dx.doi.org/10.1016/j.comnet.2009.04.014.

*Primary Examiner* — Aimee Li
*Assistant Examiner* — Dustin Bone
(74) *Attorney, Agent, or Firm* — Edward J. Lenart; Katherine S. Brown; Kennedy Lenart Spraggins LLP

(57) ABSTRACT

Presenting enclosure cache as local cache in an enclosure attached server, including: determining, by the enclosure, a cache hit rate for local server cache in each of a plurality of enclosure attached servers; determining, by the enclosure, an amount of available enclosure cache for use by one or more of the enclosure attached servers; and offering, by the enclosure, some portion of the available enclosure cache to an enclosure attached server in dependence upon the cache hit rate and the amount of available enclosure cache.

3 Claims, 4 Drawing Sheets

(56) References Cited

U.S. PATENT DOCUMENTS

| | | |
|---|---|---|
| 2005/0071564 A1 | 3/2005 | Luick |
| 2005/0071599 A1* | 3/2005 | Modha et al. ................ 711/170 |
| 2006/0224687 A1* | 10/2006 | Popkin et al. ................ 709/217 |
| 2008/0201528 A1 | 8/2008 | Hsu et al. |
| 2011/0138127 A1* | 6/2011 | Ben-Yehuda et al. ........ 711/128 |
| 2011/0145501 A1* | 6/2011 | Steely et al. ................ 711/121 |
| 2012/0089782 A1* | 4/2012 | McKean et al. ............... 711/122 |
| 2012/0290789 A1* | 11/2012 | Susarla et al. ................ 711/118 |
| 2012/0304171 A1* | 11/2012 | Joshi et al. ........................ 718/1 |
| 2013/0138891 A1* | 5/2013 | Chockler et al. .............. 711/133 |
| 2013/0238851 A1* | 9/2013 | Chang et al. .................. 711/113 |
| 2013/0346689 A1* | 12/2013 | Araki et al. .................... 711/113 |
| 2014/0025890 A1* | 1/2014 | Bert et al. ...................... 711/118 |
| 2014/0156910 A1* | 6/2014 | Uttamchandani et al. .... 711/103 |

\* cited by examiner

PRESENTING ENCLOSURE CACHE AS LOCAL CACHE IN AN ENCLOSURE ATTACHED SERVER

CROSS-REFERENCE TO RELATED APPLICATION

This application is a continuation application of and claims priority from U.S. patent application Ser. No. 13/716,991, filed on Dec. 17, 2012.

BACKGROUND OF THE INVENTION

1. Field of the Invention

The field of the invention is data processing, or, more specifically, methods, apparatus, and products for presenting enclosure cache as local cache in an enclosure attached server.

2. Description of Related Art

Modern computing systems include various types of computer memory, each of which has differing access times. In order to make use of quick access memory, many computing systems implement a cache which ideally contains the most frequently accessed data. In a cached environment, direct attached cache provides the best performance with respect to latency. Non-volatile memory can be used in this space for the cache and is less expensive than DRAM, but is still expensive enough so that over provisioning the direct attached cache to cover all possible workloads and all hotspot sizes is not economical.

SUMMARY OF THE INVENTION

Methods, apparatus, and products for presenting enclosure cache as local cache in an enclosure attached server, including: determining, by the enclosure, a cache hit rate for local server cache in each of a plurality of enclosure attached servers; determining, by the enclosure, an amount of available enclosure cache for use by one or more of the enclosure attached servers; and offering, by the enclosure, some portion of the available enclosure cache to an enclosure attached server in dependence upon the cache hit rate and the amount of available enclosure cache.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
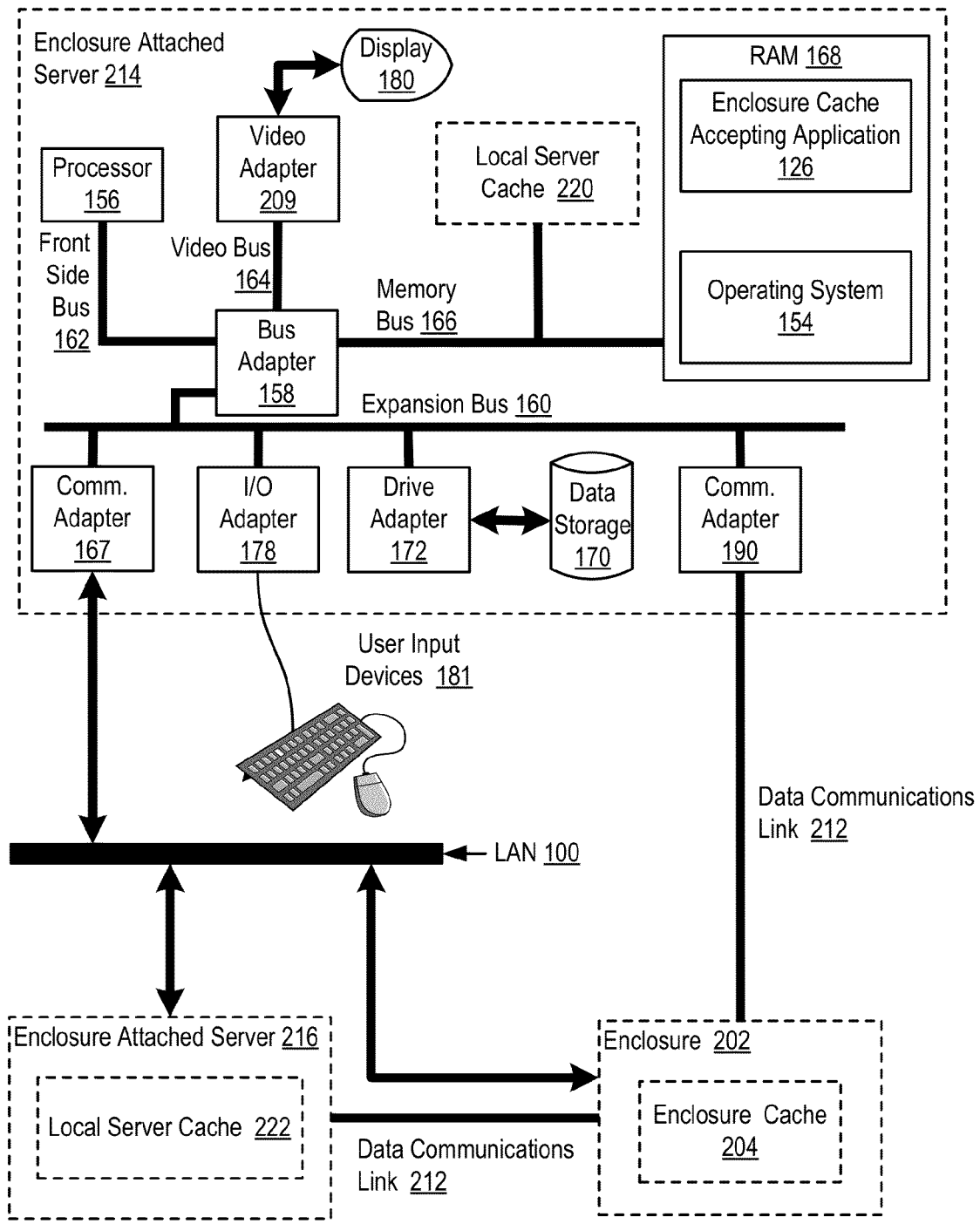
FIG. 1 sets forth a block diagram of automated computing machinery for presenting enclosure cache as local cache in an enclosure attached server according to embodiments of the present invention.

Example methods, apparatus, and products for presenting enclosure cache as local cache in an enclosure attached server in accordance with the present invention are described with reference to the accompanying drawings, beginning with FIG. 1. FIG. 1 sets forth a block diagram of automated computing machinery for presenting enclosure cache as local cache in an enclosure attached server according to embodiments of the present invention. The example of FIG. 1 includes an enclosure (202) that includes enclosure cache (204). An enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure cache (204) of FIG. 1 may be embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

FIG. 1 also includes a plurality of enclosure attached servers (214, 216), each of which includes local server cache (220, 222). The enclosure attached servers (214, 216) may be embodied, for example, as blade servers mounted in a blade center. The enclosure attached servers (214, 216) may include computer processors, computer memory, data communications adapters, and other computing hardware such that the enclosure attached servers (214, 216) operate as a fully functional computer that can run one or more services. The enclosure attached servers (214, 216) also include local server cache (220, 222). The local server cache (220, 222) may be embodied as relatively fast access memory, such as flash memory, that resides within an enclosure attached server (214, 216). In the example of FIG. 1, the enclosure cache (204) and the local server cache (220, 222) may be embodied as identical types of computer memory that are addressed identically and provide similar access times.

In the example of FIG. 1, the enclosure attached servers (214, 216) are coupled for data communications with the enclosure (202) over a data communications link (212). The data communications link (212) may be embodied, for example, as an Ethernet link, a Fibre Channel link, an InfiniBand link, or any other data communications link that enables each of the enclosure attached servers (214, 216) to communicate with the enclosure (202). Alternatively, the data communications link (212) may also be embodied as a computer bus such as a Small Computer System Interface ('SCSI') bus, Serial Attached SCSI ('SAS') bus, Serial ATA ('SATA') bus, Universal Serial Bus ('USB'), or other computer bus that can be utilized by enclosure attached servers (214, 216) and the enclosure (202) to perform memory access operations in which the enclosure attached servers (214, 216) access memory contained in the enclosure (202).

In the example of FIG. 1, presenting enclosure cache (204) as local cache in an enclosure attached server (214, 216) includes determining, by the enclosure (202), a cache hit rate for local server cache (220, 222) in each of the enclosure attached servers (214, 216). The cache hit rate for local server cache (220, 222) represents the frequency at which a memory access request initiated by an enclosure attached server (214, 216) results in the requested data being found in the local server cache (220, 222) of the enclosure attached server (214, 216). Consider an example in which a particular enclosure attached server (214) initiates 1000 commands to retrieve data from various locations in memory. In such an example, assume that the requested data is found in the local server cache (220) of the enclosure attached server (214) for 700 of the read requests, and that the remaining 300 read requests must be serviced by accessing a hard drive in the enclosure (202). In such an example, the cache hit rate for the local server cache (220) is 70%. Determining a cache hit rate for local server cache (220, 222) in each of the enclosure attached servers (214, 216) may therefore be carried out by determining the percentage of read operations initiated by each enclosure attached server (214, 216) for which the request data is found in the local server cache (220, 222) of the enclosure attached server (214, 216) that initiated the read request. In the example of FIG. 1, determining a cache hit rate for local server cache (220, 222) in each of the enclosure attached servers (214, 216) may be carried out, for example, through the use of an expander, field-programmable gate array ('FPGA'), or other form of computer logic capable of executing computer program instructions.

In the example of FIG. 1, presenting enclosure cache (204) as local cache in an enclosure attached server (214, 216) also includes determining, by the enclosure (202), an amount of available enclosure cache (204) for use by one or more of the enclosure attached servers (214, 216). The enclosure (202) includes a certain amount of enclosure cache (204), which can be expressed in terms of megabytes, gigabytes, and any other unit of measure for computer memory. In such an example, various portions of the enclosure cache (204) may be allocated for use by a particular enclosure attached server (214, 216). Determining an amount of available enclosure cache (204) for use by one or more of the enclosure attached servers (214, 216) may therefore be carried out, for example, by subtracting the amount of memory in the enclosure cache (204) that is already allocated for use by one of the enclosure attached servers (214, 216) from the total capacity of the enclosure cache (204). In such an example, the enclosure (202) may store such information, for example, in a data structure such as an allocation table that identifies all segments of memory in the enclosure cache (204), an indication as to whether each segment is free or already allocated for use, an identifier of the enclosure attached server (214, 216) that the memory segment has been allocated to, and so on. In the example of FIG. 1, determining an amount of available enclosure cache (204) for use by one or more of the enclosure attached servers (214, 216) may be carried out, for example, through the use of an expander, FPGA, or other form of computer logic capable of executing computer program instructions.

In the example of FIG. 1, presenting enclosure cache (204) as local cache in an enclosure attached server (214, 216) also includes offering, by the enclosure (202), some portion of the available enclosure cache (204) to an enclosure attached server (214, 216) in dependence upon the cache hit rate and the amount of available enclosure cache (204). Offering some portion of the available enclosure cache (204) to an enclosure attached server (214, 216) may be carried out, for example, by sending a message from the enclosure (202) to a particular enclosure attached server (214) that identifies the amount of memory in the enclosure cache (204) that the enclosure (202) can allocate for exclusive use by the particular enclosure attached server (214), the address range in the enclosure cache (204) of the memory that the enclosure (202) can allocate for exclusive use by the particular enclosure attached server (214), and so on. In the example of FIG. 1, offering some portion of the available enclosure cache (204) to an enclosure attached server (214, 216) in dependence upon the cache hit rate and the amount of available enclosure cache (204) may be carried out, for example, through the use of an expander, FPGA, or other form of computer logic capable of executing computer program instructions.

The portion of the available enclosure cache (204) that is offered to a particular enclosure attached server (214) is determined in dependence upon the cache hit rate and the amount of available enclosure cache (204). For example, the enclosure (202) may offer all of the available enclosure cache (204) to the enclosure attached server (214, 216) with the lowest cache hit rate. Alternatively, the enclosure (202) may offer a predetermined percentage of the available enclosure cache (204) to each enclosure attached server (214, 216) whose cache hit rate falls below a predetermined threshold. Likewise, the enclosure (202) may offer a relative percentage of the available enclosure cache (204) to each enclosure attached server (214, 216) based on their relative cache hit rates. For example, an enclosure attached server (214) whose cache hit rate is twice as high as another enclosure attached server (216), may only be offered half as much of the available enclosure cache (204) relative to the amount of available enclosure cache (204) offered to the enclosure attached server (216) with the lower cache hit rate. Readers will appreciate that any number of rules could be utilized to determine the amount of the available enclosure cache (204) that is offered to one or more of the enclosure attached servers (214, 216).

FIG. 1 also includes a more detailed view of one of the enclosure attached servers (214, 216). The enclosure attached server (214) of FIG. 1 includes at least one computer processor (156) or 'CPU' as well as random access memory (168) ('RAM') which is connected through a high speed memory bus (166) and bus adapter (158) to processor (156) and to other components of the enclosure attached server (214). Stored in RAM (168) is an enclosure cache accepting application (126), a module of computer program instructions useful for presenting enclosure cache (204) as local cache in an enclosure attached server (214, 216). In the example of FIG. 1, the enclosure cache accepting application (126) includes computer program instructions for determining a hit rate for local server cache (220), accepting enclosure cache (204) from the enclosure (202), and utilizing the enclosure cache (204) as if it were local server cache (220).

Also stored in RAM (168) is an operating system (154). Operating systems useful in presenting enclosure cache (204) as local cache in an enclosure attached server (214, 216) according to embodiments of the present invention include UNIX™, Linux™, Microsoft XP™, AIX™, IBM's i5/OS™, and others as will occur to those of skill in the art. The operating system (154) and the cache accepting application (126) in the example of FIG. 1 are shown in RAM (168), but many components of such software typically are stored in non-volatile memory also, such as, for example, on a disk drive (170).

The enclosure attached server (214) of FIG. 1 includes disk drive adapter (172) coupled through expansion bus (160) and bus adapter (158) to processor (156) and other components of the enclosure attached server (214). Disk drive adapter (172) connects non-volatile data storage to the enclosure attached server (214) in the form of disk drive (170). Disk drive adapters useful in computers for presenting enclosure cache (204) as local cache in an enclosure attached server (214, 216)

according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example enclosure attached server (214) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example enclosure attached server (214) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example enclosure attached server (214) of FIG. 1 includes a communications adapter (167) for data communications with other computers such as enclosure attached server (216) and for data communications with a data communications network (100). Such data communications may be carried out serially through RS-232 connections, through external buses such as a Universal Serial Bus (USW), through data communications networks such as IP data communications networks, and in other ways as will occur to those of skill in the art. Communications adapters implement the hardware level of data communications through which one computer sends data communications to another computer, directly or through a data communications network. Examples of communications adapters useful for presenting enclosure cache (204) as local cache in an enclosure attached server (214, 216) according to embodiments of the present invention include modems for wired dial-up communications, Ethernet (IEEE 802.3) adapters for wired data communications network communications, and 802.11 adapters for wireless data communications network communications.

Figure 2:
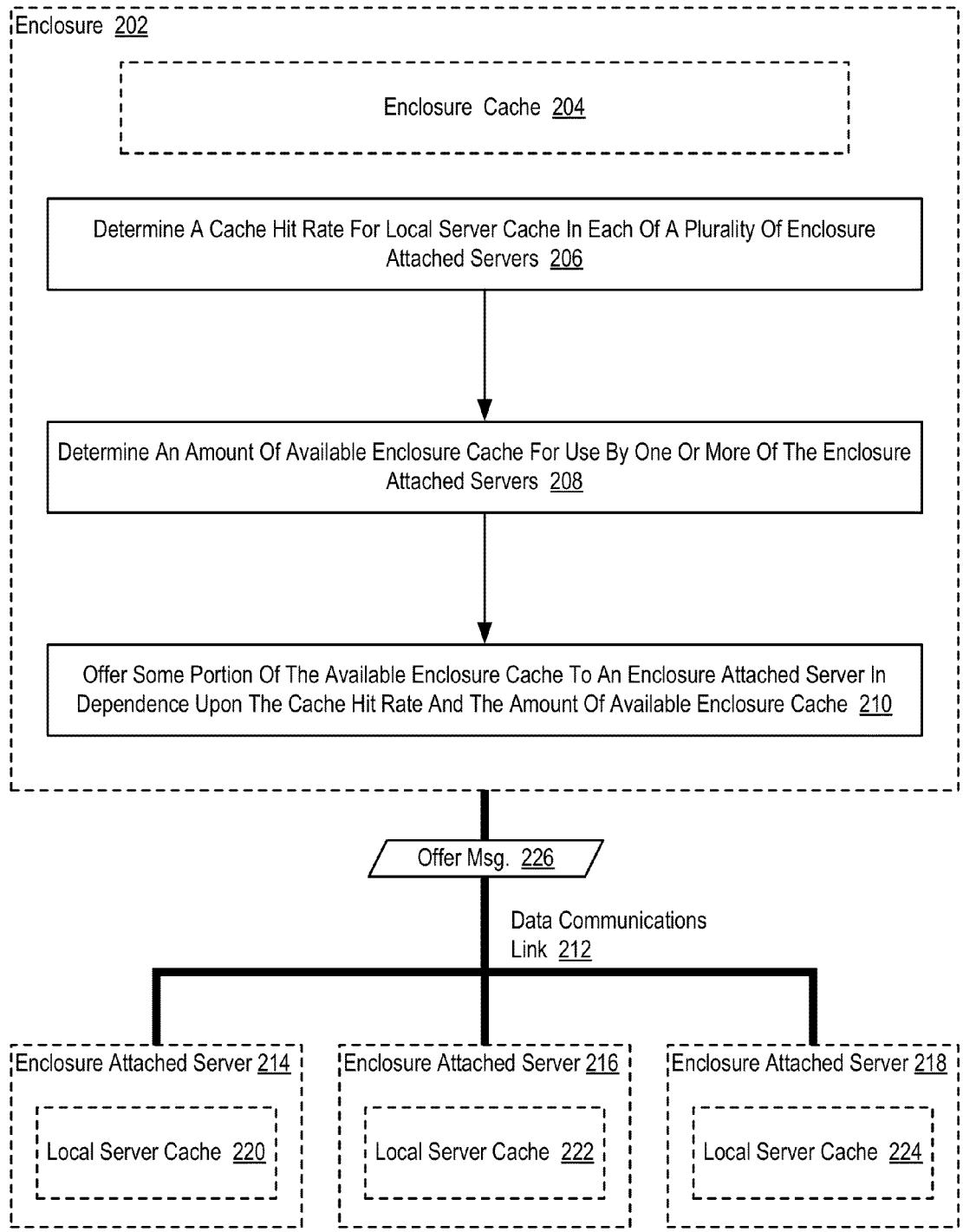
FIG. 2 sets forth a flow chart illustrating an example method for presenting enclosure cache as local cache in an enclosure attached server according to embodiments of the present invention.

For further explanation, FIG. 2 sets forth a flow chart illustrating an example method for presenting enclosure cache as local cache in an enclosure attached server according to embodiments of the present invention. The example method of FIG. 2 includes an enclosure (202) that includes enclosure cache (204). In the example method of FIG. 2, an enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure cache (204) of FIG. 2 may be embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

The example method of FIG. 2 also includes a plurality of enclosure attached servers (214, 216, 218), each of which includes local server cache (220, 222, 224). The enclosure attached servers (214, 216, 218) of FIG. 2 may be embodied, for example, as blade servers mounted in a blade center. The enclosure attached servers (214, 216, 218) of FIG. 2 may include computer processors, computer memory, data communications adapters, and other computing hardware such that the enclosure attached servers (214, 216, 218) operate as a fully functional computer that can run one or more services. The enclosure attached servers (214, 216, 218) of FIG. 2 also include local server cache (220, 222, 224). The local server cache (220, 222, 224) of FIG. 2 may be embodied as relatively fast access memory, such as flash memory, that resides within an enclosure attached server (214, 216, 218). In the example method of FIG. 2, the enclosure cache (204) and the local server cache (220, 222, 224) may be embodied as identical types of computer memory that are addressed identically and provide similar access times.

In the example method of FIG. 2, the enclosure attached servers (214, 216, 218) are coupled for data communications with the enclosure (202) over a data communications link (212). In the example method of FIG. 2, the data communications link (212) may be embodied, for example, as an Ethernet link, a Fibre Channel link, an InfiniBand link, or any other data communications link that enables each of the enclosure attached servers (214, 216, 218) to communicate with the enclosure (202). Alternatively, the data communications link (212) may also be embodied as a computer bus such as a SCSI bus, SAS bus, SATA bus, USB, or other computer bus that can be utilized by enclosure attached servers (214, 216, 218) and the enclosure (202) to perform memory access operations in which the enclosure attached servers (214, 216, 218) access memory contained in the enclosure (202).

The example method of FIG. 2 includes determining (206), by the enclosure (202), a cache hit rate for local server cache (220, 222, 224) in each of the enclosure attached servers (214, 216, 218). In the example method of FIG. 2, the cache hit rate for local server cache (220, 222, 224) represents the frequency at which a memory access request initiated by an enclosure attached server (214, 216, 218) results in the requested data being found in the local server cache (220, 222, 224) of the enclosure attached server (214, 216, 218). Consider an example in which a particular enclosure attached server (214) initiates 1000 commands to retrieve data from various locations in memory. In such an example, assume that the requested data is found in the local server cache (220) of the enclosure attached server (214) for 700 of the read requests, and that the remaining 300 read requests must be serviced by accessing a hard drive in the enclosure (202). In such an example, the cache hit rate for the local server cache (220) is 70%. In the example method of FIG. 2, determining (206) a cache hit rate for local server cache (220, 222, 224) in each of the enclosure attached servers (214, 216, 218) may therefore be carried out by determining the percentage of read operations initiated by each enclosure attached server (214, 216, 218) for which the request data is found in the local server cache (220, 222, 224) of the enclosure attached server (214, 216, 218) that initiated the read request.

The example method of FIG. 2 also includes determining (208), by the enclosure (202), an amount of available enclosure cache (204) for use by one or more of the enclosure attached servers (214, 216, 218). In the example method of FIG. 2, the enclosure (202) includes a certain amount of enclosure cache (204), which can be expressed in terms of megabytes, gigabytes, and any other unit of measure for computer memory. In such an example, various portions of the enclosure cache (204) may be allocated for use by a particular enclosure attached server (214, 216, 218). Determining (208) an amount of available enclosure cache (204) for use by one or more of the enclosure attached servers (214, 216, 218) may therefore be carried out, for example, by subtracting the amount of memory in the enclosure cache (204) that is already allocated for use by one of the enclosure attached servers (214, 216, 218) from the total capacity of the enclosure cache (204). In such an example, the enclosure (202) may store such information, for example, in a data structure such as an allocation table that identifies all segments of memory in the enclosure cache (204), an indication as to whether each segment is free or already allocated for use, an identifier of the enclosure attached server (214, 216, 218) that the memory segment has been allocated to, and so on.

The example method of FIG. 2 also includes offering (210), by the enclosure (202), some portion of the available enclosure cache (204) to an enclosure attached server (214, 216, 218) in dependence upon the cache hit rate and the amount of available enclosure cache (204). In the example method of FIG. 2, offering (210) some portion of the available enclosure cache (204) to an enclosure attached server (214, 216, 218) may be carried out, for example, by sending a message from the enclosure (202) to a particular enclosure attached server (214) that identifies the amount of memory in the enclosure cache (204) that the enclosure (202) can allocate for exclusive use by the particular enclosure attached server (214), the address range in the enclosure cache (204) of the memory that the enclosure (202) can allocate for exclusive use by the particular enclosure attached server (214), and so on.

In the example method of FIG. 2, the portion of the available enclosure cache (204) that is offered (210) to a particular enclosure attached server (214) is determined in dependence upon the cache hit rate and the amount of available enclosure cache (204). For example, the enclosure (202) may offer all of the available enclosure cache (204) to the enclosure attached server (214, 216, 218) with the lowest cache hit rate. Alternatively, the enclosure (202) may offer a predetermined percentage of the available enclosure cache (204) to each enclosure attached server (214, 216, 218) whose cache hit rate falls below a predetermined threshold. Likewise, the enclosure (202) may offer a relative percentage of the available enclosure cache (204) to each enclosure attached server (214, 216, 218) based on their relative cache hit rates. For example, an enclosure attached server (214) whose cache hit rate is twice as high as another enclosure attached server (216), may only be offered half as much of the available enclosure cache (204) relative to the amount of available enclosure cache (204) offered to the enclosure attached server (216) with the lower cache hit rate. Readers will appreciate that any number of rules could be utilized to determine the amount of the available enclosure cache (204) that is offered (210) to one or more of the enclosure attached servers (214, 216, 218).

Figure 3:
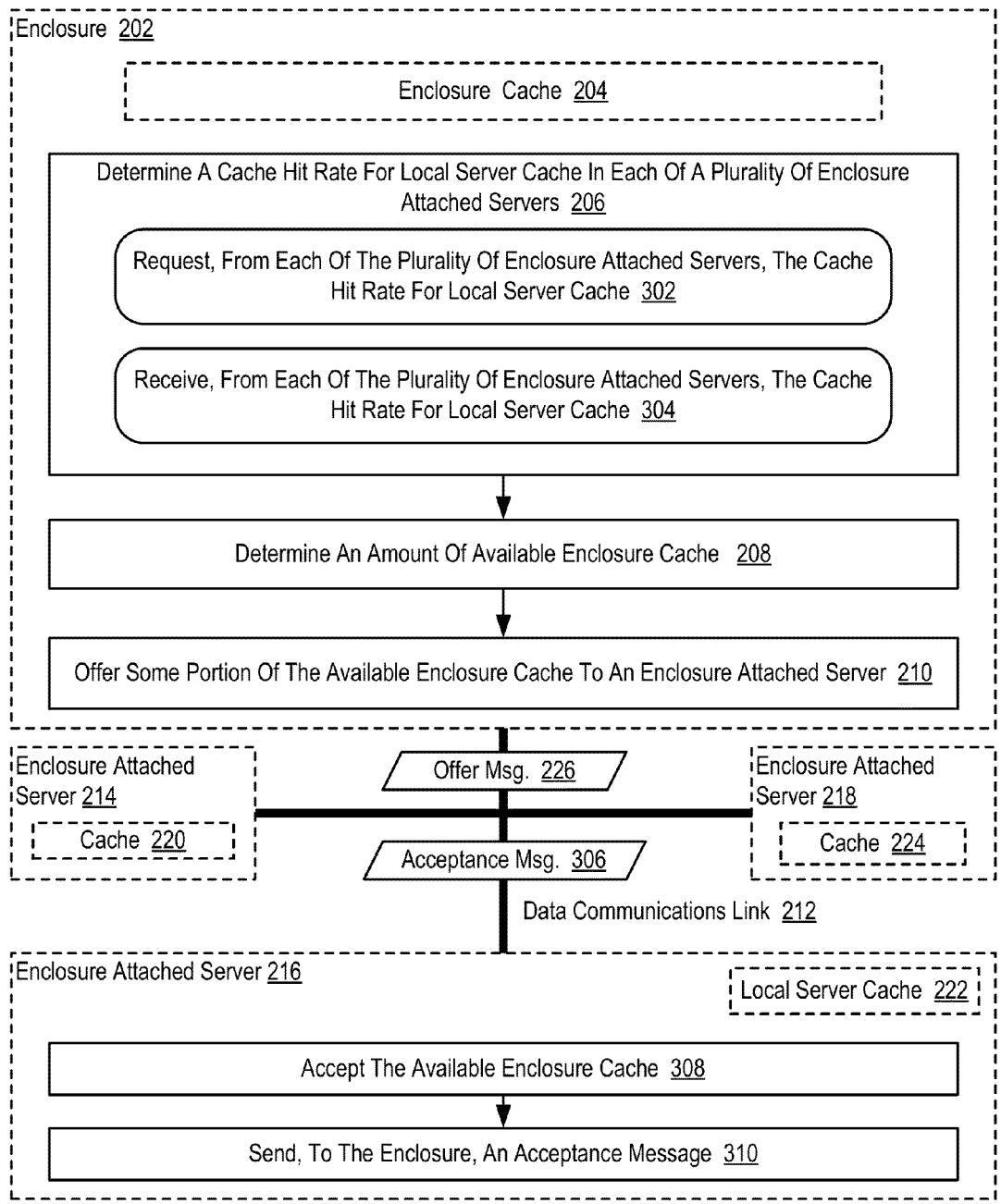
FIG. 3 sets forth a flow chart illustrating an example method for presenting enclosure cache as local cache in an enclosure attached server according to embodiments of the present invention.

For further explanation, FIG. 3 sets forth a flow chart illustrating a further example method for presenting enclosure cache as local cache in an enclosure attached server according to embodiments of the present invention. The example method of FIG. 3 is similar to the example method of FIG. 2 as it also includes determining (206) a cache hit rate for local server cache (220, 222, 224) in each of the enclosure attached servers (214, 216, 218), determining (208) an amount of available enclosure cache (204) for use by one or more of the enclosure attached servers (214, 216, 218), and offering (210) some portion of the available enclosure cache (204) to an enclosure attached server (214, 216, 218) in dependence upon the cache hit rate and the amount of available enclosure cache (204).

In the example method of FIG. 3, determining (206) a cache hit rate for local server cache (220, 222, 224) in each of a plurality of enclosure attached servers (214, 216, 218) can include requesting (302), from each of the plurality of enclosure attached servers (214, 216, 218), the cache hit rate for local server cache (220, 222, 224). In the example method of FIG. 3, each of the plurality of enclosure attached servers (214, 216, 218) may maintain its own cache hit rate for local server cache (220, 222, 224). In such an example, the enclosure may therefore request (302), from each of the plurality of enclosure attached servers (214, 216, 218), the cache hit rate for local server cache (220, 222, 224) within each of the enclosure attached servers (214, 216, 218). Such a request may be made by sending a message from the enclosure (202) to the each of the enclosure attached servers (214, 216, 218). In the example method of FIG. 3, a request can be sent from the enclosure (202) to the each of the enclosure attached servers (214, 216, 218), for example, upon the expiration of a predetermined interval of time, upon the receipt of a predetermined number of memory accesses to hard disk in the enclosure (202), and so on.

In the example method of FIG. 3, determining (206) a cache hit rate for local server cache (220, 222, 224) in each of a plurality of enclosure attached servers (214, 216, 218) can also include receiving (304), from each of the plurality of enclosure attached servers (214, 216, 218), a cache hit rate for local server cache (220, 222, 224). In the example method of FIG. 3, cache hit rate for local server cache (220, 222, 224) may be received (304) by the enclosure (202) from each enclosure attached server (214, 216, 218) through the use of a message sent from each enclosure attached server (214, 216, 218) to the enclosure (202). In such an example, each enclosure attached server (214, 216, 218) may send such a message to the enclosure (202) upon the expiration of a predetermined interval of time, in response to the cache hit rate for a particular enclosure attached server (214, 216, 218) dropping below a threshold value, in response to a request for such information from the enclosure (202), and in other ways as will occur to those of skill in the art.

The example method of FIG. 3 also includes accepting (308), by the enclosure attached server (216), the available enclosure cache (204). In the example message of FIG. 3, accepting (308) the available enclosure cache (204) may be carried out by the enclosure attached server (216) sending an acceptance message (306) to the enclosure (202). Such an acceptance message (306) can include, for example, an identifier of the enclosure attached server (216), a specification of the amount of the enclosure cache (204) to be utilized by the enclosure attached server (216), and address range in the enclosure cache (204) to be utilized by the enclosure attached server (216), and other information as will occur to those of skill in the art. In such an example, the enclosure attached server (216) can include computer program instructions for presenting the enclosure cache (204) as if it were local server cache (222).

Consider an example in which the enclosure attached server (216) included 4 GB of local server cache (222), addressed from address 0 to address 3,999,999,999. In such an example, assume that the enclosure attached server (216) accepted 1 GB of enclosure cache (204) from the enclosure (202). The enclosure attached server (216) may therefore operate as if it had 5 GB of local server cache, addressed from address 0 to address 4,999,999,999. In such an example, a memory controller or other form of computer logic and computer program instructions stored on the enclosure attached server (216) could be configured to redirect memory access requests directed at address 4,000,000,000 to address 4,999,999,999 to the enclosure cache (202) over the data communications link (212).

Figure 4:
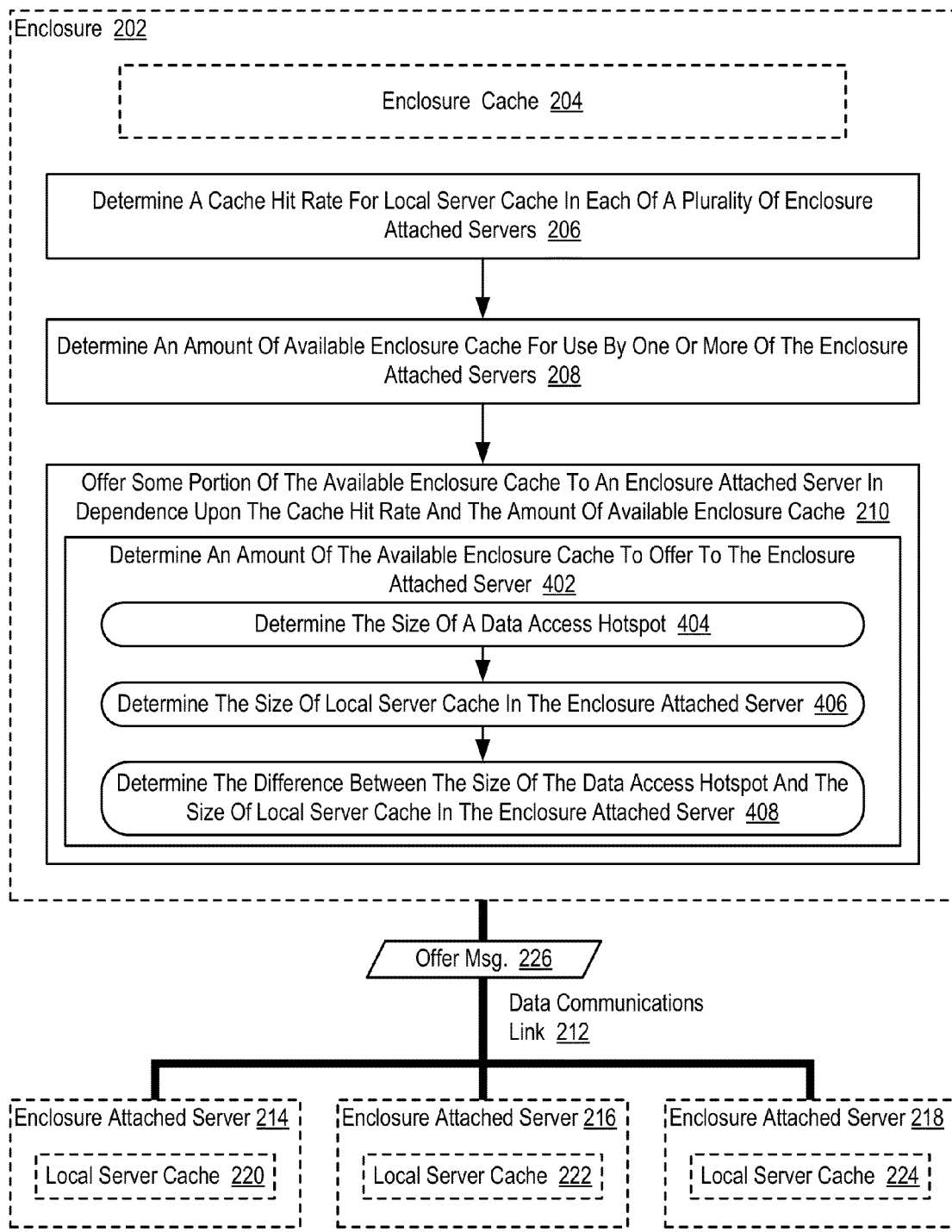
FIG. 4 sets forth a flow chart illustrating an example method for presenting enclosure cache as local cache in an enclosure attached server according to embodiments of the present invention.

For further explanation, FIG. 4 sets forth a flow chart illustrating a further example method for presenting enclosure cache as local cache in an enclosure attached server according to embodiments of the present invention. The example method of FIG. 4 is similar to the example method of FIG. 2 as it also includes determining (206) a cache hit rate for local server cache (220, 222, 224) in each of the enclosure attached servers (214, 216, 218), determining (208) an amount of available enclosure cache (204) for use by one or more of the enclosure attached servers (214, 216, 218), and offering (210) some portion of the available enclosure cache (204) to an enclosure attached server (214, 216, 218) in dependence upon the cache hit rate and the amount of available enclosure cache (204).

In the example method of FIG. 4, offering (210) some portion of the available enclosure cache (204) to an enclosure attached server (214, 216, 218) includes determining (402) an amount of the available enclosure cache (204) to offer (210) to the enclosure attached server (214, 216, 218). In the example method of FIG. 4, determining (402) an amount of the available enclosure cache (204) to offer (210) to the enclosure attached server (214, 216, 218) may be carried, for example, using an enclosure cache allocation policy. Such a policy may specify, for example, that all available enclosure cache (204) will be offered to the enclosure attached server (214, 216, 218) with the lowest cache hit rate, that a predetermined percentage of the available enclosure cache (204) will be offered to each enclosure attached server (214, 216, 218) whose cache hit rate falls below a predetermined threshold, that a relative percentage of the available enclosure cache (204) will be offered to each enclosure attached server (214, 216, 218) based on their relative cache hit rates, and so on.

In the example method of FIG. 4, determining (402) an amount of the available enclosure cache (204) to offer (210) to the enclosure attached server (214, 216, 218) can include determining (404), by the enclosure (202), the size of a data access hotspot. In the example method of FIG. 4, a data access hotspot represents a portion of memory that is accessed on a relatively frequent basis. For example, any address in memory that is accessed more frequently than a predetermined threshold may be considered to be part of the data access hotspot. In such an example, determining (404) the size of a data access hotspot may be carried out by identify each segment of memory, and the size of such a segment, that is accessed at a rate that exceeds a predetermined threshold.

Consider an example in which the enclosure (202) includes a plurality of hard drives for storing video files to support a video on demand service. In such an example, some videos may be more popular than others, such that twenty percent of all videos are accessed more frequently than a predetermined threshold rate, while eighty percent of the videos are accessed less frequently than the predetermined threshold rate. For ease of explanation, assume that the size of each video is 1 GB in file size. In such an example, the size of the data access hotspot is therefore 20 GB.

In the example method of FIG. 4, determining (402) an amount of the available enclosure cache (204) to offer (210) to the enclosure attached server (214, 216, 218) can also include determining (406), by the enclosure (202), the size of local server cache (220, 222, 224) in the enclosure attached server (214, 216, 218). In the example method of FIG. 4, determining (406) the size of local server cache (220, 222, 224) in the enclosure attached server (214, 216, 218) may be carried out, for example, by requesting such information from each enclosure attached server (214, 216, 218), by examining a system configuration file that includes such information, and in other ways as will occur to those of skill in the art.

In the example method of FIG. 4, determining (402) an amount of the available enclosure cache (204) to offer (210) to the enclosure attached server (214, 216, 218) can also include determining (408), by the enclosure (202), the difference between the size of the data access hotspot and the size of local server cache (220, 222, 224) in the enclosure attached server (214, 216, 218). Consider the example described above in which the size of the data access hotspot was 20 GB. In this example, assume that the size of local server cache (220, 222, 224) in the enclosure attached server (214, 216, 218) was 12 GB such that the difference between the size of the data access hotspot and the size of local server cache (220, 222, 224) in the enclosure attached server (214, 216, 218) is 8 GB.

In such an example, each time a particular enclosure attached server (214, 216, 218) attempts to access one of the more popular video files, there is roughly a sixty percent chance that the video file will not be found in local server cache (220, 222, 224) as the local server cache (220, 222, 224) is only large enough to hold sixty percent of the popular videos at one time. The amount of enclosure cache (204) to offer (210) to the enclosure attached server (214, 216, 218) may therefore be determined (402) to be 8 GB, such that the local server cache (220, 222, 224) inside a particular enclosure attached server (214, 216, 218) and the enclosure cache (204) made available to the particular enclosure attached server (214, 216, 218) is large enough to hold the data access hotspot, such that the more frequently accessed memory locations can be stored in cache for faster access.

In the example described above, the size of the data access hotspot was greater than the size of local server cache (220, 222, 224), such that capacity limitations of the local server cache (220, 222, 224) limited the cache hit rate that may be experienced with the local server cache (220, 222, 224). Readers will appreciate that the cache hit rate that may be experienced with the local server cache (220, 222, 224) may also be impacted when the data access hotspot migrates. Consider an example in which the enclosure (202) and the enclosure attached servers (214, 216, 218) support a website that provides news articles to online users. On a first day, the portions of memory that includes news articles related to events that occurred on the first day may represent the data access hotspot. On a second day, as additional new stories break and additional newsworthy events occur, the portions of memory that include news articles related to events that occurred on the second day may represent the data access hotspot. That is, the data access hotspot may migrate over time. In such an example, a lower than desired cache hit rate that may be experienced with the local server cache (220, 222, 224) because the data access hotspot has migrated—not because there is not enough memory in the local server cache (220, 222, 224) to support the data access hotspot. As such, determining (408) the difference between the size of the data access hotspot and the size of local server cache (220, 222, 224) may be useful for the purposes of determining the cause of a low cache hit rate. For example, if the data access hotspot is larger than the size of local server cache (220, 222, 224), a low cache hit rate is likely caused by a capacity limitation in the local server cache (220, 222, 224). Likewise, if the data access hotspot is smaller than the size of local server cache (220, 222, 224), a low cache hit rate is likely caused by a migration of the data access hotspot. When a low cache hit rate is likely caused by a capacity limitation in the local server cache (220, 222, 224), enclosure cache (204) may be offered to the enclosure attached server (214, 216, 218) on a more permanent basis whereas enclosure cache (204) may be offered to the enclosure attached server (214, 216, 218) on a more temporary basis when a low cache hit rate is likely caused by the migration of the data access hotspot.

Example embodiments of the present invention are described largely in the context of a fully functional computer system for presenting enclosure cache as local cache in an enclosure attached server. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by computer program instructions on a computing device, the computing device comprising a first cache, the computing device attached to a server that includes a second cache and is physically separate from the computing device:
        requesting and receiving, from the server, a cache hit rate for the second cache;
        determining an amount of the first cache that is available for offering to the server; and
        based on the cache hit rate and the amount of the first cache that is available, offering for use, some portion of the first cache to the server.

2. The method of claim 1 wherein offering for use, some portion of the first cache to the server in further comprises determining an amount of the some portion of the first cache to offer to the server.

3. The method of claim 1 wherein determining an amount of the first cache that is available for offering to the server further comprises:
    determining the size of a data access hotspot;
    determining the size of the second cache in the server; and
    determining the difference between the size of the data access hotspot and the size of the second cache in the server.

* * * * *